US012301573B2

(12) United States Patent
Vincent et al.

(10) Patent No.: US 12,301,573 B2
(45) Date of Patent: May 13, 2025

(54) ACCESSING AN INTERNET OF THINGS DEVICE USING BLOCKCHAIN METADATA

(71) Applicant: nChain Licensing AG, Zug (CH)

(72) Inventors: Stephane Vincent, Luxembourg (LU); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 287 days.

(21) Appl. No.: 17/876,427

(22) Filed: Jul. 28, 2022

(65) Prior Publication Data
US 2023/0091605 A1    Mar. 23, 2023

Related U.S. Application Data

(63) Continuation of application No. 16/320,945, filed as application No. PCT/IB2017/054428 on Jul. 21, 2017, now Pat. No. 11,405,395.

(30) Foreign Application Priority Data

Jul. 29, 2016  (GB) ..................................... 1613106
Jul. 29, 2016  (GB) ..................................... 1613107

(51) Int. Cl.
*G06F 21/00*   (2013.01)
*G06Q 20/06*   (2012.01)
(Continued)

(52) U.S. Cl.
CPC ........... *H04L 63/10* (2013.01); *G06Q 20/065* (2013.01); *G06Q 20/0658* (2013.01);
(Continued)

(58) Field of Classification Search
CPC ..... H04L 63/10; H04L 9/0637; H04L 9/0643; H04L 9/0825; H04L 63/0442;
(Continued)

(56) References Cited

U.S. PATENT DOCUMENTS 5,892,900 A    4/1999  Ginter et al.
10,425,414 B1  9/2019  Buckingham et al.
(Continued)

FOREIGN PATENT DOCUMENTS

CN    105516059 A    4/2016
CN    105790954 A    7/2016
(Continued)

OTHER PUBLICATIONS

Ahamad et al., "A Survey on Crypto Currencies," Proceedings of the 4th International Conference on Advances in Computer Science, AETACS, Dec. 2013, 7 pages.
(Continued)

*Primary Examiner* — Mahfuzur Rahman
(74) *Attorney, Agent, or Firm* — Tarolli, Sundheim, Covell & Tummino LLP

(57) ABSTRACT

The computer-implemented invention provides a method and corresponding system for controlling access to and/or use of an internet-enabled resource. The invention uses an electronic ledger such as, for example, the Bitcoin blockchain. The resource may be an IoT device or system. Access to the resource is permitted or enabled upon provision of a cryptographic key e.g., a private key which corresponds to a public key which has been stored in memory. In one embodiment, the public key is stored in a DHT. Access to the resource is prevented or disabled by removing the public key from memory and using a redeem script of a second blockchain Transaction to spend a tokenised output of a first blockchain Transaction. The second transaction detokenizes the token (or 'coloured coin') contained within the first Transaction. In order to prevent further access to the resource, an encrypted message is sent to the internet-enabled resource, wherein the message communicates a public key and the redeem script. The resource then checks
(Continued)

whether the public key in the message matches that stored in memory and, if it does, removes the stored version of the public key from memory. The resource then uses the redeem script to perform the detokenization.

11 Claims, 8 Drawing Sheets

(51) Int. Cl.

| | |
|---|---|
| *G06Q 20/38* | (2012.01) |
| *G06Q 30/0645* | (2023.01) |
| *H04L 9/06* | (2006.01) |
| *H04L 9/08* | (2006.01) |
| *H04L 9/40* | (2022.01) |
| *H04L 67/12* | (2022.01) |
| *H04W 12/03* | (2021.01) |
| *H04W 12/08* | (2021.01) |
| *H04L 9/00* | (2022.01) |
| *H04W 4/70* | (2018.01) |
| *H04W 4/80* | (2018.01) |

(52) U.S. Cl.
CPC ....... *G06Q 20/3829* (2013.01); *G06Q 20/389* (2013.01); *G06Q 30/0645* (2013.01); *H04L 9/0637* (2013.01); *H04L 9/0643* (2013.01); *H04L 9/0825* (2013.01); *H04L 63/0442* (2013.01); *H04L 67/12* (2013.01); *H04W 12/03* (2021.01); *H04W 12/08* (2013.01); *G06Q 2220/00* (2013.01); *H04L 9/50* (2022.05); *H04L 2209/56* (2013.01); *H04W 4/70* (2018.02); *H04W 4/80* (2018.02)

(58) Field of Classification Search
CPC ....... H04L 67/12; H04L 9/50; H04L 2209/56; H04L 9/3239; H04L 63/0428; H04L 63/126; H04L 9/06; G06Q 20/065; G06Q 20/0658; G06Q 20/3829; G06Q 20/389; G06Q 30/0645; G06Q 2220/00; G06Q 10/06; G06Q 20/308; G06Q 20/14; G06Q 20/3827; G06Q 20/385; H04W 12/03; H04W 12/08; H04W 4/70; H04W 4/80
See application file for complete search history.

(56) References Cited

U.S. PATENT DOCUMENTS

| | | | |
|---|---|---|---|
| 10,949,856 B1 | 3/2021 | Rangan | |
| 11,057,198 B2 | 7/2021 | Linder | |
| 11,195,177 B1 | 12/2021 | Vijayvergia | |
| 11,210,663 B2 | 12/2021 | Voorhees | |
| 11,563,571 B1 | 1/2023 | Teja | |
| 11,687,885 B2* | 6/2023 | Clark | G06Q 20/341 |
| | | | 705/75 |
| 12,063,291 B2* | 8/2024 | Kheterpal | H04L 9/0643 |
| 2003/0034873 A1 | 2/2003 | Chase et al. | |
| 2007/0027799 A1 | 2/2007 | Manelis et al. | |
| 2015/0006895 A1 | 1/2015 | Irvine | |
| 2015/0120567 A1 | 4/2015 | Van Rooyen et al. | |
| 2015/0120569 A1 | 4/2015 | Belshe et al. | |
| 2015/0145645 A1 | 5/2015 | Stanfield et al. | |
| 2015/0222517 A1 | 8/2015 | McLaughlin et al. | |
| 2015/0379510 A1 | 12/2015 | Smith | |
| 2016/0035054 A1 | 2/2016 | Branscomb et al. | |
| 2016/0086175 A1* | 3/2016 | Finlow-Bates | G06Q 20/4015 |
| | | | 705/77 |
| 2016/0098723 A1 | 4/2016 | Feeney | |
| 2016/0162897 A1 | 6/2016 | Feeney | |
| 2016/0308957 A1 | 10/2016 | Zhang et al. | |
| 2017/0046806 A1 | 2/2017 | Haldenby et al. | |
| 2017/0109744 A1 | 4/2017 | Wilkins et al. | |
| 2017/0109748 A1 | 4/2017 | Kote | |
| 2017/0206523 A1 | 7/2017 | Goeringer et al. | |
| 2017/0232300 A1* | 8/2017 | Tran | G06F 1/163 |
| | | | 434/247 |
| 2017/0279774 A1 | 9/2017 | Booz et al. | |
| 2017/0300876 A1 | 10/2017 | Musiala, Jr. et al. | |
| 2017/0317997 A1 | 11/2017 | Smith et al. | |
| 2017/0337552 A1 | 11/2017 | Mandal et al. | |
| 2017/0344988 A1 | 11/2017 | Cusden et al. | |
| 2017/0372417 A1 | 12/2017 | Gaddam et al. | |
| 2018/0062831 A1 | 3/2018 | Zhang | |
| 2018/0078843 A1* | 3/2018 | Tran | G09B 19/0038 |
| 2018/0117446 A1* | 5/2018 | Tran | G06F 1/163 |
| 2018/0117447 A1* | 5/2018 | Tran | G09B 19/0038 |
| 2018/0254905 A1 | 9/2018 | Chun | |
| 2018/0264347 A1* | 9/2018 | Tran | G06V 40/28 |
| 2019/0120929 A1 | 4/2019 | Meadow | |
| 2020/0059470 A1 | 2/2020 | Umezurike | |
| 2021/0226926 A1 | 7/2021 | Crabtree et al. | |
| 2021/0390531 A1 | 12/2021 | Voorhees et al. | |

FOREIGN PATENT DOCUMENTS

| | | |
|---|---|---|
| CN | 105809062 A | 7/2016 |
| CN | 107438003 A | 12/2017 |
| JP | 2006009333 A | 1/2006 |
| JP | 2006244223 A | 9/2006 |
| JP | 2007085009 A | 4/2007 |
| JP | 2012079109 A | 4/2012 |
| JP | 5879451 B1 | 3/2016 |
| JP | 2020188446 A | 11/2020 |
| KR | 1020090054598 A | 6/2009 |

OTHER PUBLICATIONS

Akmeemana, "Blockchain Takes Off—How Distributed Ledger Technology Will Transform Airlines," Blockchain Research Institute Whitepaper, Oct. 2017, 34 pages.
Anonymous, "Forth (programming language)," Wikipedia the Free Encyclopedia, edited Aug. 25, 2021, https://en.wikipedia.org/wiki/Forth_(programming_language), 15 pages.
Anonymous, "Internet of Things," Wikipedia the Free Encyclopedia, page created 2007 (last edited May 18, 2021) [retrieved May 18, 2021], https://en.wikipedia.org/wiki/Internet_of_things, 42 pges.
Anonymous, "Reverse Polish Notation," Wikipedia, the Free Encyclopedia, edited Aug. 11, 2021, https://en.wikipedia.org/wiki/Reverse_Polish_notation, 11 pages.
Anonymous, "Smart lock," Wikipedia, https://en.wikipedia.org/w/index.php?title=Smart_lock&oldid=730402325, Jul. 18, 2016 [retrieved Mar. 8, 2019], 1 pages.
Antonopoulos, "Mastering Bitcoin—Unlocking Digital Cryptocurrencies," O'Reilly Media, Inc., Dec. 20, 2014, 282 pages.
Assia et al., "Colored Coins—BitcoinX," Brave New Coin, Nov. 2013, http://bravenewcoin.com/assets/Whitepapers/ColoredCoins-BitcoinX.pdf, 7 pages.
Bitfury Group, "Digital Assets on Public Blockchains," White Paper, BitFury Group Limited, Mar. 15, 2016, http://bitfury.com/content/5-white-papers-research/bitfury-digital_assets_on_public_blockchains-1.pdf, 37 pages.
Bloch, "Bitcoin: Bigger than the Internet," Medium, https://medium.com/@collegecrypto/bitcoin-bigger-than-the-internet-6aea2d48c9db, Dec. 14, 2014 [retrieved Mar. 8, 2019], 4 pages.
Christidis et al., "Blockchains and Smart Contracts for the Internet of Things," IEEE Access 4(1):2292-2303, May 10, 2016.
Franco, "Understanding Bitcoin: Cryptography, Engineering and Economics," Wiley, ISBN: 978-1-119-01916-9, Oct. 2014, 144 pages.
Gerhardt et al., "Homomorphic Payment Addresses and the Pay-to-Contract Protocol," 2012, 11 pages.
International Search Report and Written Opinion mailed Jul. 21, 2017, Patent Application No. PCT/IB2017/054426, 14 pages.
International Search Report and Written Opinion mailed Jul. 21, 2017, Patent Application No. PCT/IB2017/054428, 12 pages.

(56) References Cited

OTHER PUBLICATIONS

Irfan et al., "Smart Contract Management System," Pakistan Institute of Engineering & Applied Sciences, Jul. 2019, 71 pages.
Jentzsch et al., "Slock.it DAO demo at Devcon1: IoT + Blockchain," YouTube, https://www.youtube.com/watch?=49wHQoJxYPo (transcript from https://www.voicetube.com/videos/print/33573), Nov. 12, 2015 (published online Nov. 13, 2015) [retrieved Mar. 13, 2019], 4 pages (transcript 7 pages).
Lim et al., "Blockchain Technologies in E-commerce: Social Shopping and Loyalty Program Applications," International Conference on Human-Computer Interaction, Jul. 26, 2019, 16 pages.
Magnussen et al., "Checkmultisig a worked out example," Bitcoin Stack Exchange, Sep. 26, 2015, https://bitcoin.stackexchange.com/questions/40669/checkmultisig-a-worked-out-example, 5 pages.
Mainelli et al., "The impact and potential of blockchain on securities transaction lifecycle," SWIFT Institute Working Paper No. 2015-007, Apr. 11, 2016 (published by SSRN on May 9, 2016), 82 pages.
Menezes et al., "Handbook of Applied Cryptography," CRC Press, Oct. 16, 1996, 811 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Prisco, "Slock.It To Introduce Smart Locks Linked To Smart Ethereum Contracts, Decentralize The Sharing Economy," Bitcoin Magazine, Nov. 5, 2015, https://bitcoinmagazine.com/articles/slock-it-to-introduce-smart-locks-linked-to-smart-ethereum-contracts-decentralize-the-sharing-economy-1446746719, pages.
Rubasinghe et al., "Transaction Verification Model Over Double Spending for Peer-to-Peer Digital Transactions Based on Blockchain Architecture," International Journal of Computer Applications, Apr. 2017, 8 pages.
Sileniced et al., "Can someone come up with some examples on how ethereum might change the global economy?," Reddit r/ethereum, https://www.reddit.com/r/ethereum/comments/2dxruc/can_someone_come_up_with_some_examples_on_how/, Aug. 18, 2014 [retrieved Mar. 13, 2019], 7 pages.
Sulaiman et al., "Improving Scalability in Vehicular Communication Using One-Way Hash Chain Method," Elsevier, Oct. 12, 2012, 15 pages.
Talerecursion, "Forum Post on r/slockit," Reddit, https://www.reddit.com/r/slockit/comments/4dk24k/use_cases_for_the_ethereum_computer/, Apr. 2016, 1 page.
Theymos et al., "Script," Bitcoin Wiki, http:/web.archive.org/web/20160714165653/https://en.bitcoin.it/wiki/Script, Dec. 19, 2010 (archived version Jul. 14, 2016) [retrieved Mar. 14, 2019], 8 pages.
Todd et al., "bips/bip-0016.mediawiki," GitHub, Apr. 9, 2019, https://github.com/bitcoin/bips/blob/master/bip-0016.mediawiki, 6 pages.
UK Commercial Search Report mailed Oct. 10, 2016, Patent Application No. GB1613107.0, 6 pages.
UK Commercial Search Report mailed Oct. 28, 2016, Patent Application No. GB1613106.2, 7 pages.
UK IPO Search Report mailed Feb. 6, 2017, Patent Application No. GB1613106.2, 4 pages.
UK IPO Search Report mailed Feb. 6, 2017, Patent Application No. GB1613107.0, 4 pages.
Zhang et al, "An IoT electric business model based on the protocol of bitcoin," 2015 18th International Conference on Intelligence in Next Generation Networks, Feb. 15, 2015, 8 pages.
Wikipedia, "Distributed Hash Table", https://en.wikipedia.org/w/index.php?title=Distributed_hash_table&oldid=729279440, retreived from the internet on Apr. 26, 2023, 8 pages.
Anonymous, "Script," Bitcoin Wiki, Jun. 8, 2017, 12 pages.
Wiki, "Transaction" en.bitcoin.it/wiki/Transaction, last edited on Jan. 17, 2024, 8 pages.
Developer Guide—Bitcoin, [online], Jun. 11, 2016, [searched on Sep. 30, 2021], <URL: https://web.archive.org/web/20160611164915/https://bitcoin.org/en/developer-guide>.

* cited by examiner

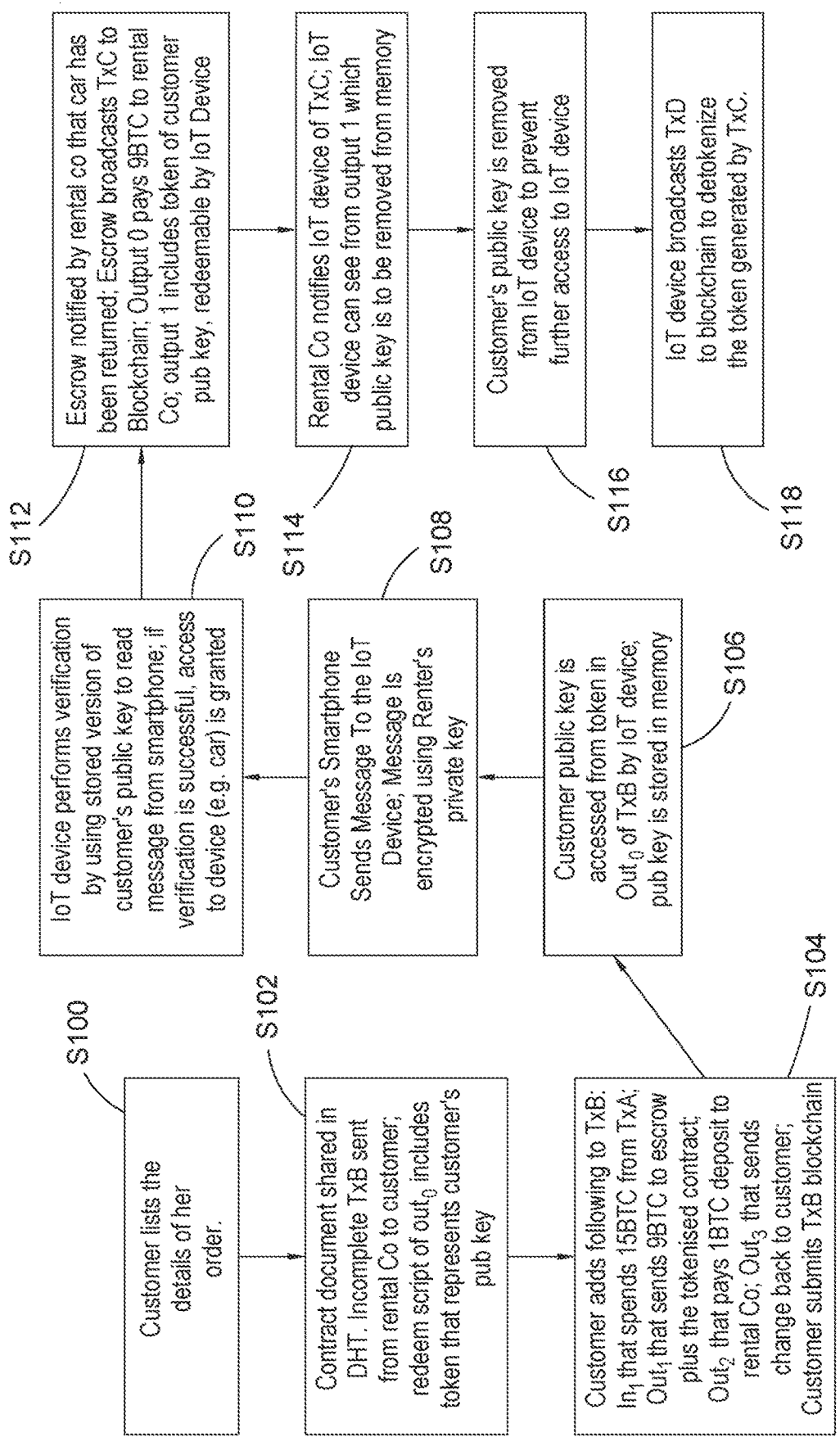

| | | | TxB proposal |
|---|---|---|---|
| Transaction identifier | | | |
| Version number | | | 1 |
| Number of inputs | | | 1 |
| Input[0] (unlocking) | Previous transaction | Hash | Previous Tx |
| | | Output index | 00 |
| | Length of signature script | | |
| | Signature script | | <company's signature> <company's public key> |
| | SIGHASH flag | | SIGHASH_NONE\|SIGHASH_ ANYONECANPAY |
| | Sequence number | | |
| Number of outputs | | | 1 |
| Output[0] (unlocking) | Value | | Few satoshis |
| | Length of public key script | | |
| | Public key script | | OP_HASH160 <hash160(redeem script)> OP_EQUAL |
| Locktime | | | 0 or pick-up time |

FIG. 3a

| | | | |
|---|---|---|---|
| Transaction identifier | | | TxB |
| Version number | | | 2 |
| Number of inputs | | | 2 |
| Input[0] (unlocking) | Previous transaction | Hash | Previous Tx |
| | | Signature script | 00 |
| | Length of signature script | | |
| | Signature script | | <company's signature> <company's public key> |
| | SIGHASH flag | | SIGHASH_NONE\|SIGHASH_ANYONECANPAY |
| | Sequence number | | |
| Input[1] (unlocking) | Previous transaction | Hash | TxA |
| | | Output index | 00 |
| | Length of signature script | | |
| | Signature script | | <renter's signature> <renter's public key> |
| | SIGHASH flag | | SIGHASH_ALL |
| | Sequence number | | |
| Number of outputs | | | 4 |
| Output[0] (unlocking) | Value | | Few satoshis |
| | Length of public key script | | |
| | Public key script | | OP_HASH160 <hash160(redeem script)> OP_EQUAL |
| Output[1] (unlocking) | Value | | 9 BTC |
| | Length of public key script | | |
| | Public key script | | OP_HASH160 <hash160(redeem script)> OP_EQUAL |
| Output[2] (unlocking) | Value | | 1 BTC |
| | Length of public key script | | |
| | Public key script | | OP_DUP HASH160 <company's public key> OP_EQUALVERIFY OP_CHECKSIG |
| Output[3] (unlocking) | Value | | 5 BTC |
| | Length of public key script | | |
| | Public key script | | OP_DUP HASH160 <renter's public key> OP_EQUALVERIFY OP_CHECKSIG |
| Locktime | | | 0 or pick-up time |

Redeem Script for Output[0]:
OP_1 <metadata of hash (renter's public key)> <car's public key>
OP_2 OP_CHECKMULTISIG Redeem Script for Output[1]:
OP_2 <metadata contract> <renter's publickey> <company's public key> <escrow's public key>
OP_4 OP_CHECKMULTISIG

- Coloured coin (token) - renter's pubKey
- Cost of rental to multi-signature address; plus: Coloured coin (token) - contract hash number
- Deposit to Car Rental Company
- Change back to customer Added by customer { Input[0], Input[1]
Added by customer { Output[0], Output[1] }

FIG. 3b

| Transaction identifier | | TxC | |
|---|---|---|---|
| Version number | | | |
| Number of inputs | | 2 | |
| Input[0] (unlocking) | Previous transaction | Hash | TxB |
| | | Output index | 00 |
| | Length of signature script | | |
| | Signature script | | \<renter's signature> \<company's signature> redeem script |
| | SIGHASH flag | | SIGHASH_ALL |
| | Sequence number | | |
| Input[0] (unlocking) | Previous transaction | Hash | TxB' |
| | | Output index | 00 |
| | Length of signature script | | |
| | Signature script | | \<escrow's signature> redeem script |
| | SIGHASH flag | | SIGHASH_ALL |
| | Sequence number | | |
| Number of outputs | | 2 | |
| Output[0] (unlocking) | Value | | 9 BTC |
| | Length of public key script | | |
| | Public key script | | OP_DUP_HASH160 \<company's public key> OP_EQUALVERIFY OP_CHECKSIG |
| Output[1] (unlocking) | Value | | Few satoshis |
| | Length of public key script | | |
| | Public key script | | OP_HASH160 \<hash160(redeem script)> OP_EQUAL |
| Locktime | | 0 | |

Redeem Script:
OP_1 \<metadata of hash (renter's public key)>
\<car's public key>
OP_2 OP_CHECKMULTISIG

FIG. 4

| | | | TxB' |
|---|---|---|---|
| Transaction identifier | | | |
| Version number | | | 1 |
| Number of inputs | | | |
| Input[0] (unlocking) | Previous transaction | Hash | Previous Tx |
| | | Signature script | 00 |
| | Length of signature script | | |
| | Signature script | | <renter's signature> <renter's public key> |
| | SIGHASH flag | | SIGHASH_ALL |
| | Sequence number | | |
| Number of outputs | | | 1 |
| Output[0] (unlocking) | Value | | Few satoshis |
| | Length of public key script | | |
| | Public key script | | OP_HASH160 <hash160(redeem script)> OP_EQUAL |
| Locktime | | | 0 or pick-up time |

Redeem Script for Output[0]:
OP_1 <metadata of hash (renter's public key)> <escrow's public key> OP_2 OP_CHECKMULTISIG

FIG. 5

| | | | |
|---|---|---|---|
| Transaction identifier | | | TxD |
| Version number | | | |
| Number of inputs | | | 2 |
| Input[0] (unlocking) | Previous transaction | Hash | TxC |
| | | Signature script | 01 |
| | Length of signature script | | |
| | Signature script | | <car's signature> redeem script |
| | SIGHASH flag | | SIGHASH_ALL |
| | Sequence number | | |
| Number of outputs | | | 1 |
| Output[0] (unlocking) | Value | | Few satoshis |
| | Length of public key script | | |
| | Public key script | | OP_DUP HASH160 <company's public key> OP_EQUALVERIFY OP_CHECKSIG |
| Locktime | | | 0 |

FIG. 6

ACCESSING AN INTERNET OF THINGS DEVICE USING BLOCKCHAIN METADATA

CROSS REFERENCE TO RELATED APPLICATIONS

This application is a continuation of U.S. Pat. No. 11,405,395, filed Jan. 25, 2019, entitled "ACCESSING AN INTERNET OF THINGS DEVICE USING BLOCKCHAIN METADATA," which is a 371 Nationalization of International Patent Application No. PCT/IB2017/054428, filed Jul. 21, 2017, entitled "BLOCKCHAIN-IMPLEMENTED METHOD AND SYSTEM," which claims priority to United Kingdom Patent Application No. 1613107.0, filed Jul. 29, 2016, entitled "COMPUTER-IMPLEMENTED METHOD AND SYSTEM," and United Kingdom Patent Application No. 1613106.2, filed Jul. 29, 2016, entitled "COMPUTER-IMPLEMENTED METHOD AND SYSTEM," the disclosures of which are incorporated herein by reference in their entirety.

FIELD OF INVENTION

This invention relates generally to distributed ledger technology (including blockchain related technologies), and in particular the use of a blockchain in controlling access to a resource such as, for example, a device, system, service or electronic/digital resource. The invention is particularly suited for use in providing and/or prohibiting access to internet-enabled devices. It is also suited for use in situations where temporary access to a resource is desired e.g., in rental situations. Aspects of the invention relate also to the Internet of Things (IoT). The invention may be suited for controlling an IoT device.

BACKGROUND OF INVENTION

In this document we use the term 'blockchain' for the sake of convenience and ease of reference because it is currently the most widely known term in this context. The term is used herein to include all forms of electronic, computer-based distributed ledgers, including blockchains, alt-chains, side-chains and transaction-chain technologies, permissioned and un-permissioned ledgers, shared ledgers and variations thereof.

A blockchain is an electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems.

One area of current interest and research is the use of the blockchain for the implementation of "smart contracts." These are computer programs designed to automate the execution of the terms of a contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token, which has no discernable meaning or value. The token thus serves as an identifier that allows the real-world item to be referenced.

The invention also relates to the use of a blockchain-implemented mechanism to control access to a resource. This resource can be an "internet of things (IoT)" device. IoT has been described by Wikipedia as "the network of physical devices, vehicles, buildings and other items embedded with electronics, software, sensors, and network connectivity that enables these objects to collect and exchange data . . . . The IoT allows objects to be sensed and controlled remotely across existing network infrastructure."

The present invention is defined in the appended claims.

The invention may provide a method and/or system. It may be a control method/system. It may be a computer-implemented method/system. It may be a blockchain-implemented method/system. It may be arranged to utilise blockchain transactions. It may be arranged to utilise a blockchain protocol. The invention may be arranged to facilitate control of access to, or use of, a resource. Thus, the invention may be arranged to provide temporary control of a resource. It may be arranged to grant and/or deny access to/use of the resource.

The resource may be an internet-enabled resource. It may be an Internet-of-Things (IoT) resource. It may be a device or plurality of devices. It may be a vehicle, building or machine. The internet-enabled resource may be provided, owned, managed by a resource provider.

The invention may provide a verification or authentication method/system. The invention may involve the use of at least one cryptographic key. This may be part of a public/private key pair. The cryptographic key(s) may be generated using a shared secret.

The invention may be arranged to lock/unlock, enable or disable, operate or shut down or otherwise manipulate the state or functioning of the resource. The invention may be arranged to control temporary access to/use of the resource by a user. The invention may be arranged to implement a rental or hire process. The process may be implemented, defined and/or described in a contract. This may be a computer-executable smart contract.

The invention may provide a method for controlling access to and/or use of an internet-enabled resource. The method may comprise the step of permitting access to and/or use of the internet-enabled resource upon provision of a private key which corresponds to a public key which has been stored in memory. The public key may be stored in memory which is in, on or connected to the resource. Additionally or alternatively, it may be stored in a location which is remote or distinct from the internet-enabled resource.

Additionally or alternatively, the method may comprise the step of preventing access to and/or use of the internet-enabled resource by removing the public key from memory.

Additionally or alternatively, the step of preventing access and/or use may comprise using a redeem script of a second blockchain Transaction to spend a tokenised output of a first blockchain Transaction.

The method may comprise the step of using an instruction, flag, code or opcode, or portion of computer code (which we will refer to as a 'time lock mechanism' for convenience) to broadcast a transaction to the blockchain network and/or specify a date and/or time when an output of the transaction can be spent. This may be achieved using, for example, the Bitcoin CheckLockTimeVerify (CLTV) operation or a functionally similar or equivalent mechanism. Additionally or alternatively, the time lock mechanism may be implemented using a suitably arranged computing agent. The transaction may be the first and/or second Transaction. The time lock mechanism can be used to broadcast the Transaction to the blockchain network or spend the output at a specific time, e.g. when the access to or control of the resource is to be granted, denied, altered or revoked. The time-lock mechanism may be specified by a resource user, or by the resource provider or by a third party.

The public key 124, or a reference to its location 120, or a hash of the public key may be stored in a Distributed Hash Table, or in any form of database, or any form of computer-based storage. See FIG. 1*a* described infra.

The public key 124 which has been stored in memory may be accessible by the internet-enabled resource ("IER") 110.

The step of preventing access to the internet-enabled resource may further involve sending a message to the internet-enabled resource. The message may communicate a public key. Additionally or alternatively, it may communicate the redeem script. Additionally or alternatively, it may communicate an indicator, such as a hash, an address or a reference, which enables the public key to be located from a storage resource.

The method may further comprise the step of checking whether the public key stored in memory is related to, or matches, the public key communicated by the message.

The tokenised output 122 may comprise a locking script which includes metadata. The metadata may comprise the public key 124 or a hash of the public key or an identifier which may be used to locate the public key.

Access to the internet-enabled resource may be permitted upon provision of the private key by an encrypted message which has been signed using the private key 126. The method may further comprise the step of enabling access to the internet-enabled resource if the stored public key 124 can be used to decrypt the message 128. Thus, the invention may provide a verification tool for verifying the identity of a user or user-related device.

The encrypted message 128 may be generated and/or encrypted by a portable or handheld computing device 108. This may be a tablet computer, a smart phone, a laptop. This may be referred to as a client device. The client device may be arranged to generate a public and/or private cryptographic key. Alternatively, the encrypted message may be generate/encrypted by a computing device which is not handheld or portable e.g. a PC.

The redeem script may comprise a cryptographic key associated with the internet-enabled resource. The cryptographic key may be a public key.

The method may further comprise the step of providing the first and/or second blockchain transaction to a blockchain network. Thus, the first and/or second Transaction may be validated and/or mined within a blockchain network.

The invention also provides a computer-implemented system arranged to perform any embodiment of the method described above.

A system in accordance with the invention may comprise:
an internet-enabled resource; this may be an IoT device or apparatus; and/or
a blockchain; and/or
an internet-enabled device associated with a user and arranged to store a cryptographic key associated with the user. The (client) device may be a portable or handheld computing device.

The client device may be a smartphone or tablet computer or laptop. The client device may be arranged to generate a public and/or private cryptographic key. It may do this using a secret value. This may be a shared secret. The client device may be arranged to execute software, such as an "app." The app may be arranged to interact with, communicate with the resource. It may be arranged to store a cryptographic key in a secure manner. It may be arranged to use the key to encrypt a message. It may be arranged to communicate the encrypted message to the resource. This may be achieved via a wireless communication channel and/or protocol. The app may be arranged to communicate with another software resource provided on a server. The server may be operated by or for the resource provider. The server may host a web site. The web site may enable a user to register an interest in controlling, accessing and/or using the internet-enabled resource. The server-side software may be arranged to generate a smart contract. The smart contract may comprise terms and/or conditions relating to use of/access to the internet-enabled resource.

The internet-enabled resource may be arranged to generate a blockchain Transaction and provide the Transaction to a blockchain network.

Any feature described in relation to one aspect or embodiment of the invention may be equally applicable to any other aspect or embodiment of the invention. Any feature(s) described in relation to the method may also apply to the system, and vice versa.

The invention may provide a method and/or system substantially as described in the following illustrative embodiment involving a car rental scenario.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 1*b* provides a flow chart showing the steps involved in the hire of a car using a system in accordance with the embodiment.

FIGS. 3a and 3b illustrate a first blockchain transaction which is used to enable access to an internet-enabled car.

FIG. 4 shows a second blockchain transaction which is used to remove access to the car.

FIG. 5 illustrates a third blockchain transaction which is used to control access to the car.

FIG. 6 illustrates a fourth blockchain transaction which is used to detokenize an amount of cryptocurrency used in the car hire process of the example.

Figure 1A:
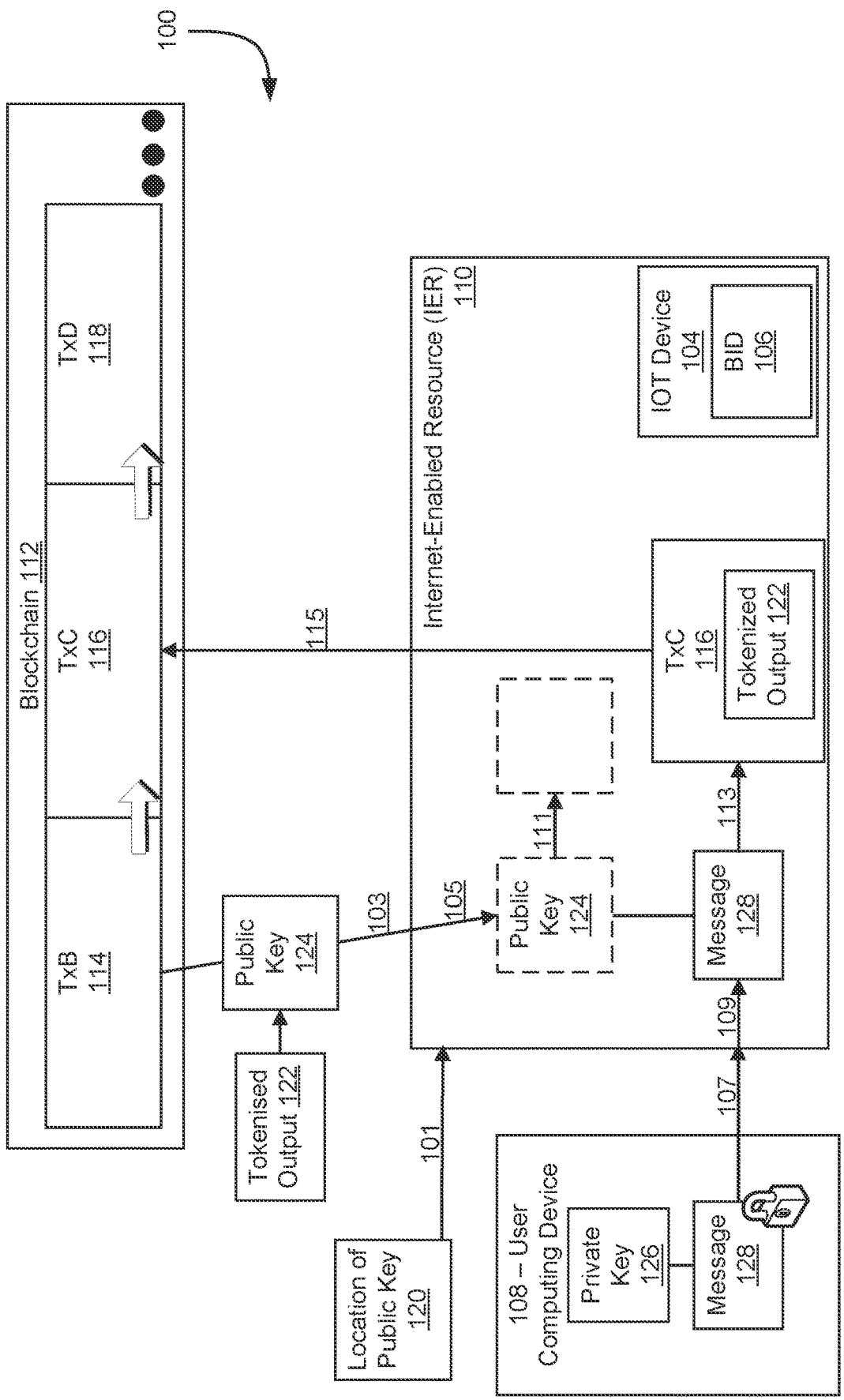
FIG. 1*a* shows a system in accordance with an illustrative embodiment of the invention.

The invention provides a mechanism for providing, terminating and controlling temporary access to a resource. Advantageously, it uses a blockchain protocol to allow a user with access to the Internet to interact with a resource. This could be any type of resource, but in the present example provided herein, the resource is an internet-enabled hire car. The method exploits the full spectrum of transaction possibilities available in conjunction with blockchain protocols, i.e., regular (e.g., Bitcoin) transactions, smart contracts and "coloured coin" (tokenised) transactions.

Access to the resource is permitted or enabled upon provision of a signature provided by a private key which corresponds to a public key that has been stored in memory. In one embodiment, the public key is stored in a DHT. Access to the resource is prevented or disabled by removing the public key from memory, and using a redeem script of a second blockchain Transaction to spend a tokenised output 122 of a first blockchain Transaction. The second transaction detokenizes the token (or 'coloured coin') contained within the first Transaction. In order to prevent further access to the resource, an encrypted message is sent to the internet-enabled resource, wherein the message communicates a public key and the redeem script. The resource then checks whether the public key in the message matches that stored in memory and, if it does, removes the stored version of the public key 124 from memory. The resource then uses the redeem script to perform the detokenization. Thus, a simple, effective and highly secure locking/unlocking technique is provided.

Illustrative Use Case—Vehicle Rental

For the purposes of illustration only, we provide an example in which the invention is used for vehicle rental services. Car rental services include wide-ranging services related to renting vehicles for specific time periods, ranging from a few hours to a few months. These services are often offered via websites and through online reservations and smartphone applications. Changes in customer preferences due to fast adoption of smartphone technology, coupled with fast Internet access, are one of the key factors responsible for industry growth. However, it should be noted that this use case example of a car hire process is not intended to be limiting. The invention is equally of benefit in other contexts and applications, where temporary access to some type of resource needs to be controlled. The underlying infrastructure described herein can be utilised for a variety of transactions where a permanent record is desired and where two or more parties wish to implement any type of access-related agreement, e.g., contracts for rent of a residential property.

The invention provides an improved access solution which is extremely convenient for users to interact with. It does not require the user (e.g., renter) to physically go to a pre-determined location in order to effect or cease access. For example, in a conventional rental situation, the renter would need to go to a rental office to collect the car or property keys, or sign a contract etc. The invention avoids this problem because it enables a computing device e.g., smartphone to function as the access mechanism e.g., car/house keys. Moreover, the invention's incorporation of a software application provides the ability to search, and it allows users to register their details.

One important aspect of the invention is that it can exploit mechanisms for broadcasting a blockchain transaction to a blockchain network and/or allowing an output to become spendable at a specified time. For example, the Bitcoin CheckLockTimeVerify (CLTV) mechanism can be used in a Transaction. With respect to the present invention, this can be advantageous as it can be used to automate execution of the contract. For example, it can be used to control when access to or use of the resource can be granted, altered or denied.

It is also important to note that the resource uses Internet of Things (IoT) devices to perform a range of possible functions such as resource-related functionality. The user's cryptographic key (PubKey) is communicated to the resource for storage thereon or therein, in order to grant access. The key is subsequently removed from the resource's memory in order to prohibit further access. The IoT device is a programmable "Blockchain IOT Device (BID)" i.e., it is an internet-enabled device which is also able to monitor, interact with and publish to a blockchain network. The invention also includes a communication protocol. In a preferred embodiment, this enables communication with the resource via a software application (app).

FIG. 1a illustrates system 100 used to implement a system 100 in accordance with an illustrative embodiment of the invention. However, the skilled person will understand that variations to system 100 are possible while still falling within the scope of the invention.

System 100 comprises:
- a server 102 which hosts a website which is used by customers to rent cars
- an internet-enabled resource 110, such as a car, comprising an IoT device 104 which comprises a Blockchain IoT device (BID) 106
- a smartphone or other computing device 108 e.g., tablet, laptop etc., which is configured to transmit messages to the IER 110 via the IoT device 104 using near-field communication or Bluetooth™ or any other suitable, and preferably wireless, transmission protocol.

In this example, the "Blockchain IOT Device (BID)" is a computing Agent that is set up to execute predetermined instructions which are stored securely off-BID and accessed via cryptographic keys. By 'off-BID' we mean that the instructions are not provided within the BID itself, but are stored elsewhere and accessed as and when required. These instructions are selected and arranged to perform a chosen task or plurality of tasks. When executed, the instructions can control and influence the behaviour of the IOT device. The BID may reside on the IOT device itself, meaning that the BID is installed in memory provided in or on the IOT device. However, in other embodiments the BID may reside off-device and have internet connectivity to the device.

The IOT device has its own cryptographic key (as well as an IP address) so it can securely communicate and interact with other devices or DHTs, etc. Its 'operating system' is a simple, generic system with some embedded functionality for (at least, but not limited to):
- cryptographic calculations
- retrieving instructions from an external source (such as a DHT)
- performing simple actions such as toggling switches (i.e., as on the physical IOT device)

Thus, neither the IOT device or its associated BID contain their own built-in instructions and neither 'knows' what it does or how to do it. The BID only contains a mechanism for securely retrieving instructions from elsewhere. A BID can only perform a set of simple actions (the following are illustrative only and not limiting):

- Access to its own master private and public key pair; it also has its own (derivable) BTC address.
- Ability to send data to an IP address or receive data from an IP address
- Secret Sharing protocol calculations—in a preferred embodiment these may be embedded in machine code
- Look up and interpret Blockchain events
- Operate and control the physical device it is attached to (via a standard API that is essentially just a set of switches)

Figure 2:
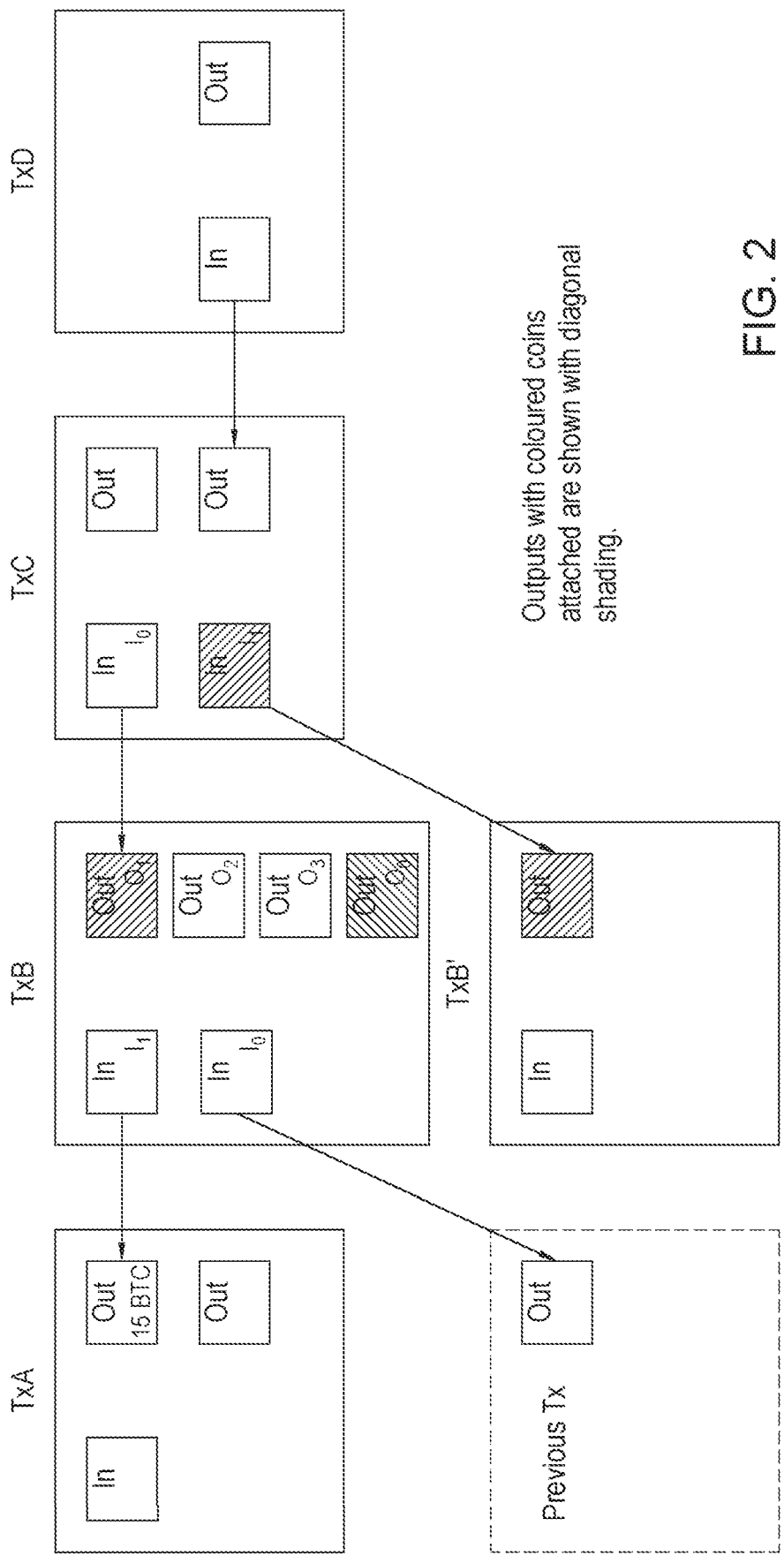
FIG. 2 shows a plurality of blockchain transactions and their respective inputs/outputs which may be used to implement an embodiment of the invention.

The BID's incoming and outgoing communications can be encrypted using a security mechanism which enables keys to be created using shared secrets. This allows:

(i) greater security from 'hacking'
(ii) simple universal software upgrade protocols
(iii) device agnosticism We now describe the various phases of the car hire process using the system 100 and with reference to a chain of (Bitcoin) transactions as illustrated in FIG. 2. The rental process is described using three "phases":

1. Phase 1: the rental agreement is set up between the participating parties
2. Phase 2: access to the resource is granted i.e., the customer uses the resource
3. Phase 3: access to the resource is removed because the contract has terminated from some reason e.g. it has expired at a certain time in accordance with the terms of the contract, or a terminating event has taken place such as the return of a rental vehicle.

Phase 1: Contract Set-Up

See FIGS. 1b and 2. In this example, the resource provider is the car rental company and the resource is the vehicle which has an internet-enabled computer on board. A customer (who may also be referred to as a "user" or "renter" in this example) enters the details of her order via the provider's website to indicate her desire to enter into a rental agreement with the hire company. The customer provides his/her public key to the rental company. The public key has a corresponding private key, which together form a cryptographic key pair as is known in the art. See step S100, FIG. 1b.

In response to this, the car hire company generates a new contract. This is a machine-executable "smart contract" (hereinafter simply referred to as a "contract"). Smart contracts are known in the art. The car hire company shares the contract by publishing it in a publicly available Distributed Hash Table (DHT) in step S102, FIG. 1b. The contract contains the terms of the car hire such as, for example, pick-up and the return times, details of the model vehicle, etc. The customer is informed of the location of the contract (or sent a copy of it) so that the customer can view the terms and conditions and decide if he/she wishes to proceed. In this example, we assume that the cost of the car rental is 10 Bitcoins (BTC).

Advantageously, registration of the contract on the DHT also allows a third party to access the document and review the terms in case of dispute. However, in some embodiments security mechanisms may be used to restrict access to the contract to authorised individuals or groups—for example, a password or some other form of authentication may be required.

Generation of Proposed Transaction TxB By Car Hire Company

The company also generates a blockchain 112 transaction (TxB) 114 which is sent to the customer (but not to the blockchain network). See proposed transaction TxB of FIG. 3a. In order for the rental agreement to be implemented, the renter will need to complete Transaction TxB 114 as prepared by the rental company. The proposed transaction includes a token (or 'coloured coin'). Herein, the terms 'token' and 'coloured coin' are used interchangeably. As is known in the art, a token can be used to convey data via a 'regular' blockchain transaction by including some metadata. This is achieved by including an output 122 which provides some intrinsic value (e.g. some Bitcoins) and includes the token within the metadata of the output's locking script. In the present case, the script of Output 0 contains metadata which includes the hash of the customer's public key. The tokenised coin can be spent using a blockchain address that belongs to the rental car. Thus, the car will be able to access the customer's public key via the token when the agreement is implemented. This is shown in step 102 of FIG. 1b.

Therefore, proposed transaction TxB serves as confirmation of the rental company's intention to enter into the rental agreement with the renter, and also provides a way for the car to know about the renter's public key. Proposed TxB also allows the renter to view the transaction which contains a hash of her public key and an output (Output 1) which is addressed to the car.

When proposed transaction TxB (114) is transmitted to the renter it has a single input ($I_0$) and a single output ($O_0$). The input spends the output of a previous transaction 144 (also as shown in dotted box in FIG. 2) and is signed with the digital signature of the car rental company.

The first input ($I_0$) of proposed blockchain transaction TxB comprises the SIGHASH flag SIGHASH_NONE|SIGHASH_ANYONECANPAY which enables inputs and outputs to be added to TxB. Use of SIGHASH_NONE protects the input in that no one can change it. However, the renter is able to change the output.

The locking script for this output $O_0$ includes a hash of the renter's public key. The locking script contains the following:

OP_HASH160 <hash160(redeem script)>OP_EQUAL

In order to unlock output $O_0$ of TxB the following redeem script is required:

OP_1 <metadata hash (renter's public key)> <car's public key> OP_2 OP_CHECKMULTISIG This metadata in the script comprises the 'coloured coin' which will allow the car to access the renter's public key when the set-up process has been completed.

Generation of Transaction TxB' by Car Hire Company

When the car hire company submits the contract document to the DHT it also generates a new document which contains a hash of the renter's public key and shares it to the DHT. TxB' 500 is a blockchain transaction which includes an output having a coloured coin attached to it. See FIG. 5. The coloured coin is used to inform the escrow agent of the location 120 of the renter's public key. This is needed for the termination phase of the rental process, as discussed below. The redeem script for TxB' is given as:

OP_1 <metadata of hash (renter's public key)> <escrow's public key> OP_2 OP_CHECKMULTISIG.

Therefore, the escrow's public key is required to unlock TxB' and gain access to the renter's public key.

Completion of TxB by Customer

If the customer wishes to proceed with the car hire, (s)he spends a Bitcoin (or other digital currency) that she owns from a previous transaction (TxA). See step S104, FIG. 1b and FIG. 2. We assume that the coin value of the previous output is 15 BTC and the cost of the vehicle rental is 10 BTC.

The renter then completes proposed TxB by adding an input ($I_1$) which is signed by the renter. Input 1 spends the 15 BTC from TxA (see step S104, FIG. 1b). The renter also adds three outputs to transaction TxB which pay:

(i) one tokenised coin with an intrinsic value of 9 BTC to a multi-signature address—output1;
(ii) 1 BTC as a deposit to the company—Output 2; and
(iii) 5 BTC back to herself—Output 3.

The completed version of TxB 302 is shown in FIG. 3b. Note that if TxA had an output of the same value as the cost of the car hire, no change would need to be returned to the customer.

As the contract has been registered in the DHT, the associated URI and hash number can be represented using a coloured coin within metadata in a script. This allows the transaction to be associated with the contract, and allows the contract to be referenced and accessed if security permissions permit it.

The redeem script for Output 1 of TxB is:

OP_2 <metadata contract> <renter's public key> <company's public key> <escrow's public key>OP_4 OP_CHECKMULTISIG The two different redeem scripts for TxB's output $O_0$ and output $O_1$ are shown in FIG. 3b which provides an annotated example of Transaction TxB.

"Renter's public key" is the public key of the customer who is borrowing the car. "Car's public key" is the public key of the car which is being borrowed. "Company's public key" is the public key of the company that is facilitating the car rental. "Escrow's public key" is the public key of the escrow agent."

The token representing the contract is a 2-of-3 multisig address that includes the renter's signature, the company's signature and the escrow agent's signature. A multi-signature transaction requires more than one signature in order for the funds to be transferred. In the present scenario, the 2-of-3 multisig mechanism is useful because it enables the renter to provide funds into the transaction with the rental company and third-party arbitrator (escrow agent) named as potential signatories. If the transaction goes smoothly, then both customer and the rental company sign the transaction, and the funds are forwarded to the rental company. If something goes wrong, they can sign a transaction to refund the customer. If they cannot agree, the escrow agent will arbitrate and provide a second signature to the party that it deems deserves it.

When TxB has been completed by the customer, it is submitted to the blockchain network. This indicates that the customer has agreed to the terms in the contract, and wishes to proceed with the care hire. The CLTV mechanism can be used to specify a time for Transaction broadcast and/or when the output can be spent.

Phase 2: Access is Enabled

In Step S106 of FIG. 1b, the IoT device 104 uses the coloured coin from TxB's output 0 to access the renter's public key 124 from the DHT. The location 120 of the public key 124 may be made available 101 to the car via a message. The message may contain a hash indicating where the public key is located in the DHT. The IoT device 104 can then add 103 the public key 124 to its database of public keys corresponding to individuals who are authorised to access the car. So now the car "knows" the customer's public key 124. Depending upon the implementation concerned, the key may be stored 105 in memory provided in or on the IoT device 104, or stored off-device in a separate location and then accessed by the device as and when required. See FIG. 1a and step S106 of FIG. 1b.

It should be noted, however, that in other embodiments of the invention the renter's public key 124 could be communicated to the IoT device 104 in any other suitable manner and not necessarily via the manner described in this example.

The customer has a smartphone 108 which contains the private key 126 which corresponds to the public key 124 provided previously to the car rental company. The smartphone may be configured to execute an application (app) which has been downloaded and installed from the car rental company's server. The app may provide functionality which enables the customer to interact with the car rental company and/or the car. The smartphone 108 communicates a message 128 ("unlock doors") to the IoT device 104. The message 128 is encrypted using the private key 126 and can only be decrypted with the corresponding public key 124. See step S108 of FIG. 1b.

The IoT device 104 receives 107 the encrypted message 128 from the smartphone, and attempts to decrypt 109 it using the public key 124 which was stored in step S106. If the message 128 cannot be decrypted to provide a predetermined value or code, then verification has failed and the car remains locked. Alternatively, if the message 128 can be successfully decrypted using the previously stored public key 124, then verification is deemed to have succeeded and vehicle is unlocked. In this way, access to the resource is either granted or denied based on the use of cryptographic keys.

During use, the smartphone app may be used to send various types of message to the car, such as "lock," "unlock," "turn on lights," etc. Each of these messages are encrypted using the customer's private key 126 and the specified task is carried out following successful decryption with the stored public key 124.

Phase 3: Access is Disabled

In the final phase, the period of hire comes to an end. This may be because the time period specified in the contract has run out, or because the customer no longer needs the vehicle, or some other reason. Therefore, the renter's temporary access to the car should now be revoked. When the vehicle has been returned (or termination of the rental period is somehow recognised by the company), the escrow agent generates 113 a first new blockchain transaction (TxC) 116 which includes using the company's signature and the renter's signature. See step S112 of FIG. 1b. The purpose of TxC is to 'release' the coloured coin so that the 9 BTC funds can be paid to the car hire company. Transaction (TxC) is illustrated in FIG. 4.

TxC comprises two inputs as illustrated in FIG. 2. The first input ($I_0$) spends output $O_1$ from TxB. The second input ($I_1$) is an output from TxB' which is illustrated in FIG. 5. TxB' was generated, as discussed above, by the car hire company.

Upon broadcast 115 of TxC to the blockchain network, the car hire company sends a message to the IoT device 104 in step S114. The message indicates that the hire process is completed. The message contains a hash of the renter's public key and the redeem script.

The IoT device 104 then removes 111, in a step S116, the renter's public key 124 from the car's memory (or wherever else it was stored) which means that the car can no longer decrypt messages from the smartphone 108.

The BID 106 then generates a second new blockchain transaction TxD 118 (see also 600) in a step S118, to detokenise or convert the coloured coin generated by TxC into a "regular" Bitcoin value.

The detokenisation is performed by creating the new transaction, TxD, which has an input containing the token, and an output that does not contain the token. In order to perform the detokenization the required signature is presented to the locking script, plus a redeem script which contains the token. This can be expressed as:

```
HASH160 <hash of redeem script containing token> EQUAL      (locking script for output of TxC)
<signature><redeem script containing token>                 (presented to locking script of TxC by TxD)
HASH160 <hash of signature> CHECKSIG   (Output of TxD: note, this does not contain the token)
```

Therefore, the token has been removed by TxD.

Benefits of the present invention include (but are not limited to):
- it is inherently secure by design—the blockchain (e.g., Bitcoin) protocol requires no trusted parties;
- as an embodiment is based on a blockchain protocol it utilises ECDSA to prove ownership, which plays a pivotal role in blockchain transactions; the invention provides strong security through the use of cryptographic technqiues
- the invention can exploit the CheckLockTimeVerify (CLTV) option/setting to broadcast the transaction at a time when access to the resource is to be granted.
- Distributed and decentralised, so avoids a large single point of failure and is not vulnerable to attack;
- easy to manage and maintain, the Bitcoin network is straightforward to use;
- inexpensive; just a small transaction fee is usually expected under the Bitcoin protocol;
- the blockchain is global and public, and can be used at any time by anyone with access to the Internet;
- transparent, once data has been written to the blockchain, anyone can see it;
- the record is immutable; once data has been written to the blockchain, no one can change it; and
- privacy and anonymity is maintained, no information is available for identification of individuals or parties.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of" The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of controlling access to an internet-enabled resource, the method implemented by a processing resource, the method comprising the steps:
   permitting access to the internet-enabled resource upon provision of a private key which corresponds to a public key;
   preventing access to the internet-enabled resource by spending a tokenised output of a first blockchain transaction using a redeem script of a second blockchain transaction; and
   using a time-lock mechanism to broadcast the second blockchain transaction to spend the tokenised output, wherein the time-lock mechanism specifies a time and/or date at which the second blockchain transaction can be broadcast.

2. The method according to claim 1, wherein the public key is stored in memory on the resource or memory which is connected to the resource.

3. The method according to claim 1, wherein the public key is stored in a location which is remote of distinct from the internet-enabled resource.

4. The method according to claim 2, wherein preventing access to the internet-enabled resource further comprises removing the public key from the memory.

5. The method according to claim 3, wherein preventing access to the internet-enabled resource further comprises removing the public key from the location.

6. The method according to claim 1, wherein the method further comprises:
   generating a third blockchain transaction comprising a first input comprising the token and an output corresponding to the first input which does not comprise the token; and
   removing the token by providing a redeem script to spend the output of the second transaction.

7. The method according to claim 1, wherein the second blockchain transaction contains an input corresponding to an output from a fourth transaction generated by a resource provider, wherein the redeem script is based on a hash of a resource provider public key.

8. The method according to claim 7, wherein the redeem script is further based on an escrow public key.

9. A computer-implemented system comprising hardware arranged to perform a method comprising:

permitting access to the internet-enabled resource upon provision of a private key which corresponds to a public key;

preventing access to the internet-enabled resource by spending a tokenised output of a first blockchain transaction using a redeem script of a second blockchain transaction; and using a time-lock mechanism to broadcast the second blockchain transaction to spend the tokenised output, wherein the time-lock mechanism specifies a time and/or date at which the second blockchain transaction can be broadcast.

10. The system according to claim 9, wherein the system further comprises:

an internet-enabled resource;

a blockchain; and an internet-enabled client device associated with a user and arranged to store a cryptographic key associated with the user.

11. The system according to claim 9, wherein the internet-enabled resource is arranged to generate a blockchain transaction and provide the generated transaction to a blockchain network.

* * * * *